United States Patent Office 2,714,589
Patented Aug. 2, 1955

2,714,589
COPPERABLE TRISAZO DYESTUFFS

Peter Hindermann, Batterie, Basel, Switzerland, assignor to J. R. Geigy A. G., Basel, Switzerland, a Swiss firm No Drawing. Application May 19, 1952,
Serial No. 288,768
Claims priority, application Switzerland June 4, 1951

4 Claims. (Cl. 260—159)

The present invention concerns the production of polyazo dyestuffs which are distinguished by their good drawing power onto cellulose fibers, the excellent wet fastness properties of the after-coppered dyeings obtained therewith and the very good fastness to light.

It has been found that by coupling in any order desired 1 mol of a diazo compound of the general Formula I:

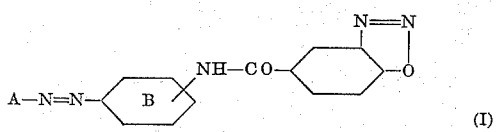

wherein A represents an o-hydroxybenzene carboxylic acid radical coupled in the p-position to the hydroxyl group and 1 mol of the nitrated diazo compound of 1-amino-2-hydroxynaphthalene-4-sulphonic acid with 1 mol of the urea of a 1-(4'-aminophenyl)-5-pyrazolone of the general Formula II:

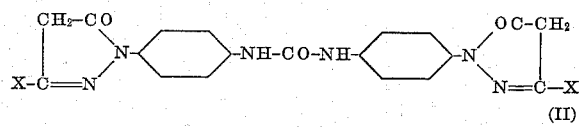

wherein X represents a low alkyl or a phenyl group, valuable trisazo dyestuffs are obtained of the general Formula III:

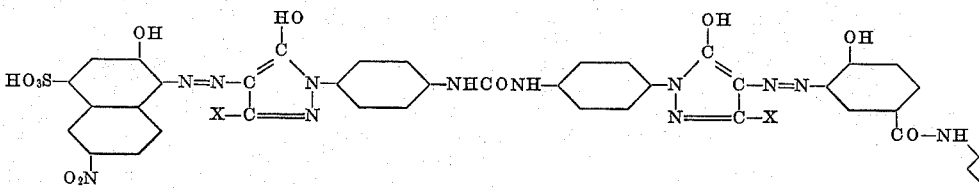

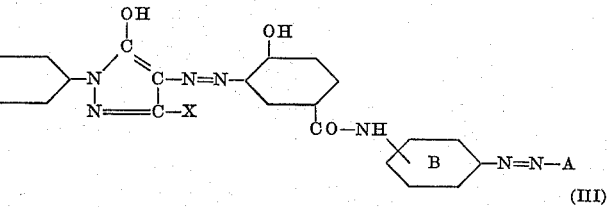

wherein A and X have the meanings given above and the aromatic radicals A and B may contain the simple substituents usual in azo dyestuffs.

The diazo compounds of the Formula I according to this invention are obtained for example by benzoylating 3- or 4-amino-3'-carboxy-4'-hydroxy-1.1'-azobenzene compounds which may contain the further substituents usual in azo dyestuffs such as halogen or methyl groups, with 4-hydroxy- or 4-acyloxy-3-nitrobenzoyl chloride, reduction of the nitro group—if necessary simultaneous saponification of the acyloxy group under mild conditions—to the primary amino group and then diazotisation of the latter in the usual way. In this process it is advantageous to perform the benzoylation at a raised temperature in an inert organic solvent, e. g. in chlorobenzene, xylene or nitrobenzene. Alkali sulphides are preferably used for the reduction of the nitro group in the nitrobenzoyl compounds and the amino group in the aminobenzoyl compounds is diazotised by the dropwise addition at a low temperature of the aqueous solution of the alkali salts with the necessary amount of sodium nitrite onto the excess mineral acid. It is also possible to obtain the diazo compounds of the Formula I according to the present invention by benzoylating m- and p-nitranilines which may contain the simple substituents usual in azo dyestuffs such as methyl, methoxy, ethoxy groups or chlorine with 4-hydroxy- or acyloxy-3-nitrobenzoyl chloride. The nitro groups are reduced to primary amino groups, if necessary the acyloxy group is saponified under mild conditions to the hydroxyl group either before, during or after the benzoylation process. The 4-hydroxy-3-aminobenzoyl-m- or -p-phenylene diamine is then tetrazotised and coupled in an alkaline medium with 1 mol of an o-hydroxycarboxylic acid coupling in the p-position to the hydroxyl group. 2-hydroxybenzoic acid and 4- or 3-methyl-2-hydroxybenzoic acid for example come into question as coupling components.

The trisazo dyestuffs according to this invention can be built up in any order desired by coupling in a weakly alkaline medium, for example in the presence of sodium carbonate, 1 mol of the urea of a 1-(4'-aminophenyl)-5-pyrazolone of Formula II with 1 mol of the nitrated diazo compound of 1-amino-2-hydroxynaphthalene-4-sulphonic acid and 1 mol of a diazo compound of Formula I usable according to the present invention. The group of trisazo dyestuffs according to the present invention which is derived from diazo compounds of Formula I having a benzoylamino group in the p-position to the azo group are distinguished by their particularly good affinity to cellulose fibres. On the other hand, dyestuffs derived from the urea of 1-(4'-aminophenyl)-3-methyl-5-pyrazolone are to be preferred because of their easier accessibility.

In the form of their alkali salts, the trisazo dyestuffs according to the present invention are brown-orange powders. They have good water solubility and dissolve in water with a brown-orange and in concentrated sulphuric acid with an orange colour. They dye cellulose fibres from a bath containing Glauber's salt in more or less brown-orange shades which change into brownish-orange on being coppered. The coppered cellulose dyeings have excellent wet fastness properties and very good fastness to light.

The direct cellulose dyeings may be coppered either in the dyebath or in a fresh bath with the usual copper salts such as copper sulphate or copper acetate in a neutral or weakly acid aqueous solution. If desired, copper compounds which are stable to alkalies can also be used such as are obtained for example by reacting copper sulphate with sodium tartrate in a soda alkaline bath.

The following examples illustrate the invention without limiting it in any way. Where not otherwise stated, parts are given as parts by weight and the temperatures are in degrees centigrade.

Example 1

39.2 parts of 3-(3''-amino-4''-hydroxybenzoylamino)-4'-hydroxy-3'-carboxy-1.1'-azobenzene are dissolved in 400 parts of cold water and 8 parts of caustic soda lye, 6.9 parts sodium nitrite are mixed in and the whole is added dropwise in the cold while stirring to 35 parts of concentrated hydrochloric acid and 80 parts of water. Diazotisation is completed after stirring for a further two hours under ice cooling. The excess mineral acid is then neutralised with soda and the diazo compound is poured slowly into a cooled alkaline solution of 69.9 parts of monoazo dyestuff obtained by partial coupling of 29.5 parts of the nitrated diazo compound of 1-amino-2-hydroxy-naphthalene-4-sulphonic acid with 40.4 parts of the urea of 1-(4'-aminophenyl)-3-methyl-5-pyrazolone in 1200 parts of water and 30 parts of soda. The coupling begins immediately and is complete after stirring for some hours at room temperature. The trisazo dyestuff obtained of the formula:

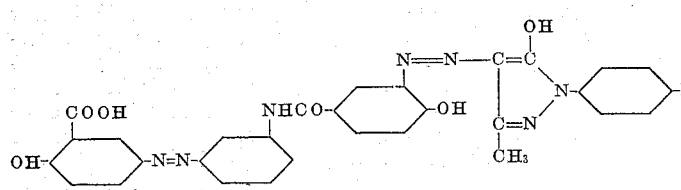

is precipitated with common salt at a raised temperature, filtered off, washed with common salt solution and dried. It is a dark powder which dissolves in water with a brown-orange and in concentrated sulphuric acid with an orange colour. After-coppered, it dyes natural or regenerated cellulose fibres in very fast orange shades which have very good fastness to light. If, instead of 39.2 parts of 3-(3″-amino-4″-hydroxybenzoylamino)-4′-hydroxy-3′-carboxy-1.1′-azobenzene, 40.6 parts of 3-(3″-amino-4″-hydroxybenzoylamino)-6-methyl-4′-hydroxy-3′-carboxy-1.1′-azobenzene are used as diazo component, a dyestuff with similar properties is obtained.

The two diazo components mentioned above are obtained by reacting 20.15 parts of 3-nitro-4-hydroxybenzoic acid chloride in boiling chlorobenzene with 25.7 parts of 3-amino-4′-hydroxy-3′-carboxy-1.1′-azobenzene or 27.1 parts of 3-amino-6-methyl-4′-hydroxy-3′-carboxy-1.1′-azobenzene and reducing the nitro products with sodium sulphide in an aqueous solution at a raised temperature to the corresponding amines.

Example 2

24.3 parts of 1-(3′-amino-4′-hydroxybenzoylamino)-4-amino-benzene in a hydrochloric acid solution are tetrazotised in the cold with 13.8 parts of sodium nitrite. The excess mineral acid is neutralised with soda and the tetrazo compound is coupled with an aqueous soda alkaline solution of 15.2 parts of 2-hydroxy-3-methyl benzene-1-carboxylic acid at room temperature to form the intermediate product. The intermediate product is completely formed after 24 hours. It is then added to a cooled soda alkaline solution of 69.9 parts of the monoazo dyestuff obtained by partial coupling of 29.5 parts of the nitrated diazo compound of 1-amino-2-hydroxynaphthalene-4-sulphonic acid with 40.4 parts of the urea of 1-(4′-aminophenyl)-3-methyl-5-pyrazolone. The coupling is complete after stirring for several hours at room temperature and the trisazo dyestuff obtained of the formula:

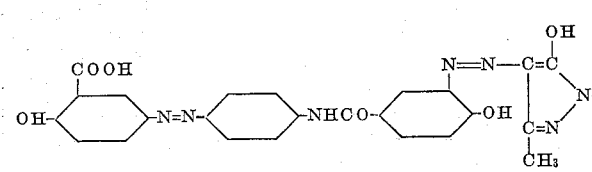

is precipitated with common salt at a raised temperature, filtered off under suction, washed with common salt solution and dried. It is a dark powder which dissolves in water with a brown-orange and in concentrated sulphuric acid with an orange shade. It dyes cotton and staple fibres in brownish orange shades which become a very fast orange when after-coppered. If, instead of 15.2 parts of 2-hydroxy-3-methyl benzene-1-carboxylic acid, 15.2 parts of 2-hydroxy-4-methyl benzene-1-carboxylic acid, 13.8 parts of salicyclic acid or 17.25 parts of 2-hydroxy-3-chlorobenzene-1-carboxylic acid are used, similar orange dyestuffs with the same good properties are obtained.

Example 3

39.2 parts of 4-(3″-amino-4″-hydroxybenzoylamino)-4′-hydroxy-3′-carboxy-1.1′-azobenzene are indirectly diazotised as described in Example 1. The diazo compound obtained is coupled in a soda alkaline aqueous solution with 69.9 parts of the monoazo dyestuff obtained by coupling 29.5 parts of the nitrated diazo compound of 1-amino-2-hydroxynaphthalene-4-sulphonic acid with 40.4 parts of the urea of 1-(4′-aminophenyl)- 3-methyl-5-pyrazolone to obtain the trisazo dyestuff of the formula:

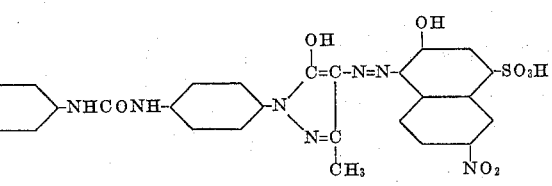

This dyestuff, a dark powder, dissolves in water with a brown-orange and in concentrated sulphuric acid with an orange shade, and when after-coppered, it dyes natural or regenerated cellulose fibers in orange shades which are fast to wet and light. If, instead of 69.9 parts of the monoazo dyestuff mentioned above, 82.3 parts of the monoazo dyestuff obtained by partial coupling of the nitrated diazo compound of 1-amino-2-hydroxy- naphthalene-4-sulphonic acid with the urea of 1-(4′-aminophenyl)-3-phenyl-5-pyrazolone are used, an orange dyestuff with the same good properties is obtained.

The 4 - (3″ - amino - 4″ - hydroxybenzoylamino) - 4′-hydroxy-3′-carboxy-1.1′-azobenzene can be produced as described in Example 1 by condensing 20.15 parts of 3-nitro-4-hydroxybenzoic acid chloride in boiling chlorobenzene with 25.7 parts of 4-amino-4′-hydroxy-3′-carboxy-1.1′-azobenzene to form the nitrohydroxybenzoyl derivative and then reducing this latter with sodium sulphide to the corresponding amine.

Example 4

42.2 parts of 4-(3″-amino-4″-hydroxybenzoylamino)-6-methoxy-4′-hydroxy-3′-carboxy-1.1′-azobenzene are in-

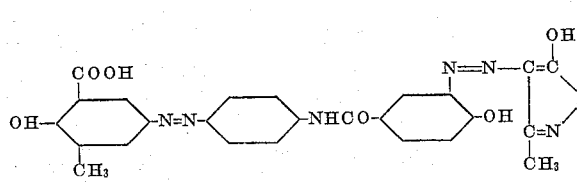

directly diazotised as described in Example 1 and partially coupled under ice cooling in the presence of excess soda with 40.4 parts of the urea of 1-(4′-aminophenyl)-3-methyl-5-pyrazolone to form the intermediate product. This product is formed after a few hours. 29.5 parts of the nitrated diazo compound of 1-amino-2-hydroxynaphthalene-4-sulphonic acid are then added at room temperature and the coupling is completed by stirring for several hours at room temperature. The trisazo dyestuff obtained of the formula:

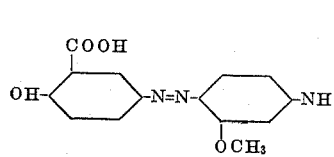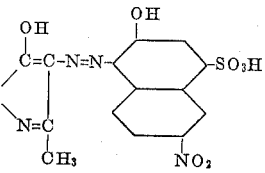

is precipitated with common salt, filtered off under suction and dried. It is a dark powder which dissolves in water with a brown-orange and in concentrated sulphuric acid with an orange colour. It dyes natural or regenerated cellulose fibres in brown orange shades which on after-coppering are converted into orange shades with excellent general fastness properties.

*Example 5*

2 parts of the dyestuff obtained according to Example 3 are dissolved in a dyebath containing 3000 parts of water and 2 parts of soda. 100 parts of cotton are entered at 40–50°, the bath is heated to 90–95° within 30 minutes, 30 parts of sodium sulphate are added and dyeing is performed for 45 minutes at this temperature. The dyed goods are then rinsed cold after which they are after-treated for 30 minutes in a fresh bath at 70° containing 2 parts of crystallised copper sulphate in 2000 parts of water and 2 parts of 30% acetic acid. The goods are rinsed and dried in the usual way. The cottom is dyed in orange shades which have excellent fastness properties.

What I claim is:

1. A trisazo dyestuff corresponding to the formula:

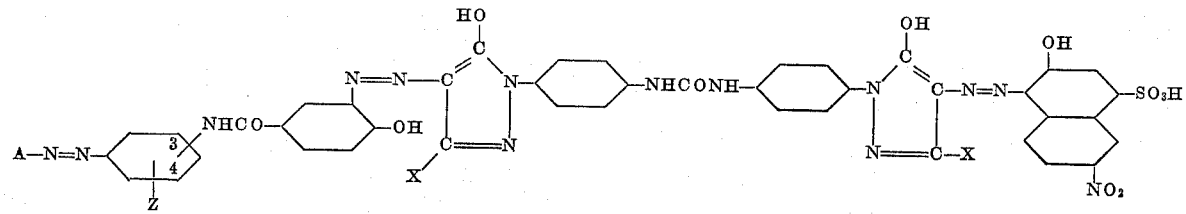

wherein A represents the radical of an o-hydroxybenzoic acid coupled in the p-position to the hydroxyl group and Z represents a member selected from the group consisting of H, —CH₃ and —OCH₃, and X represents a member selected from the group consisting of methyl and phenyl.

2. A trisazo dyestuff corresponding to the formula:

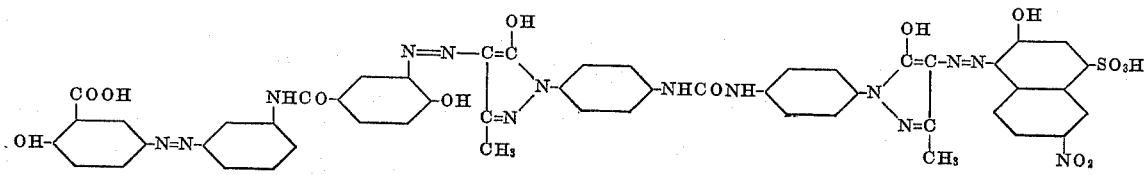

3. A trisazo dyestuff corresponding to the formula:

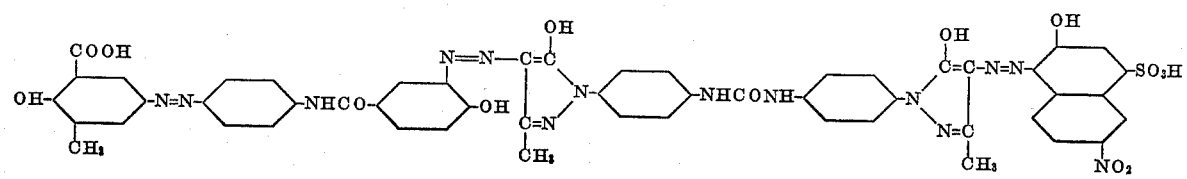

4. A trisazo dyestuff corresponding to the formula:

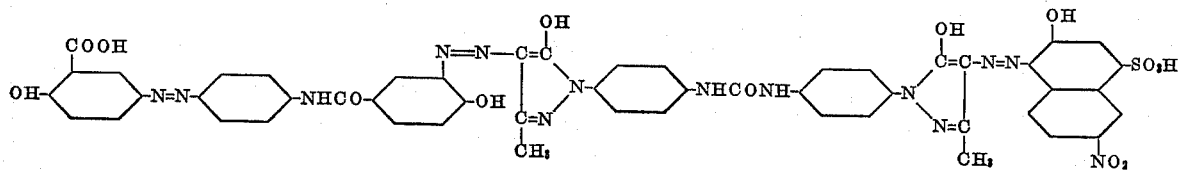

References Cited in the file of this patent

UNITED STATES PATENTS

| | | |
|---|---|---|
| 2,282,323 | Dickey et al. | May 12, 1942 |
| 2,517,312 | Hindermann | Aug. 1, 1950 |

FOREIGN PATENTS

| | | |
|---|---|---|
| 253,881 | Switzerland | Dec. 1, 1948 |